United States Patent [19]

Yamaguchi et al.

[11] Patent Number: 5,308,168
[45] Date of Patent: May 3, 1994

[54] GUIDE RAIL SIDEWARD DISPLACEMENT PREVENTING MECHANISM

[75] Inventors: Hiroki Yamaguchi; Toru Tsukada, both of Gunma, Japan

[73] Assignee: NSK Ltd., Tokyo, Japan

[21] Appl. No.: 86,855

[22] Filed: Jul. 7, 1993

[30] Foreign Application Priority Data

Jul. 8, 1992 [JP] Japan .................................. 4-181063

[51] Int. Cl.⁵ ............................................. F16C 29/06
[52] U.S. Cl. ........................................ 384/45; 384/59
[58] Field of Search ................. 384/45, 44, 43, 49, 384/50, 55, 50, 42, 41

[56] References Cited

U.S. PATENT DOCUMENTS 4,552,416 11/1985 Lehmann et al. ..................... 384/55
5,172,982 12/1992 Komiya ................................ 384/45

FOREIGN PATENT DOCUMENTS 292922 12/1987 Japan ..................................... 384/43
63-156633 6/1988 Japan ..................................... 384/49
63-147927 9/1988 Japan .

Primary Examiner—Thomas R. Hannon
Attorney, Agent, or Firm—Sughrue, Mion, Zinn, Macpeak & Seas

[57] ABSTRACT

In a linear guide device comprising: a guide rail fixedly secured to the mounting surface of a supporting member such as a machine bed; and a slider slidably engaged with the guide rail. Recesses are formed in the mounting surface of the guide rail and in the mounting surface of the supporting member, respectively, to provide a space therein. The space thus provided is filled with a hardenable filling material. The hardenable filling material is solidified therein, thus serving as a key held between the guide rail and the supporting member to prevent the guide rail from being displaced sidewards.

10 Claims, 3 Drawing Sheets

GUIDE RAIL SIDEWARD DISPLACEMENT PREVENTING MECHANISM

BACKGROUND OF THE INVENTION

This invention relates to a linear guide device, and more particularly to a mechanism for preventing guide rails from displacing sidewards in the linear guide device (hereinafter referred to as "a guide rail sideward displacement preventing mechanism", when applicable).

In general, in a linear guide device, its guide rail is extended axially and has ball rolling grooves in both sides which are also extended axially, and its slider is engaged with the guide rail through a number of rolling balls. The linear guide device thus constructed is fixedly mounted on a flat mounting surface of a machine tool or industrial machine. F/r instance, the guide rail is mounted on the upper surface of a machine bed with bolts, and the slider is secured to the lower surface of a machine table with bolts. However, when the slider is greatly shocked in a lateral direction, then it may be displaced laterally. In /rder to overcome this difficulty, as shown in FIG. 6 a stepped surface D is formed in the machine bed 3, with one side of the guide rail 1 on the stepped surface D, the guide rail 1 is pushed against the stepped surface D with a lateral push plate 5 so that the guide rail 1 is prevented from being shifted laterally.

In this case, the stepped surface D must be high in straightness, because it is necessary that the machine table guided linearly through the slider 2 by the guide rail 1 is moved with high precision; that is, it is rather difficult to machine the stepped surface D to meet the above-described requirement. In general, a machine table is guided by two guide rails. Therefore, the two guide rails must be in parallel with each other. And formation of two stepped surfaces results in an increase in manufacturing cost. In addition, it is, of course, necessary to form the lateral push plate 5, and in order to mount the latter 5 on the machine bed, it is necessary to use a number of mounting bolts, and to form a number of tapped holes in the machine bed 3 for the mounting bolts. Thus, it takes a lot of time and labor to install the guide rails.

In order to eliminate the above-described difficulties, for instance Japanese Utility Model Application (OPI) No. 147927/1988 and Japanese Patent Application (OPI) /. 156633/1988 have proposed methods of preventing a guide rail from displacing laterally. In the former method, a plurality of elongated stripe-like protrusions are formed on the mounting surface (or lower surface) of the guide rail in such a manner that they are extended longitudinally, to resist against the lateral displacement of the guide rail. On the other hand, in the latter method, a dovetail groove is formed in the base surface, and the guide rail is fixedly secured therein with bolts, and gaps between the guide rail and the dovetail groove are filled with a molding material, and the latter is solidified.

Those methods are simple, and are intended to prevent the lateral displacement of the guide rail without formation of the stepped surfaces which must be high in precision. However the former method in which the mounting surface of the guide rail is made uneven is disadvantageous in that it is impossible to positively fixedly secure the guide rail. On the other hand, the latter method, in which the dovetail groove is formed in the base surface, is intended to increase the rolling guide damping effect, and is disadvantageous in that it is rather difficult to machine the dovetail groove or to form the rail, which results in an increase in manufacturing cost. In addition, the rail is high, and therefore the guide rail is liable to be bent when subjected to thermal treatment.

SUMMARY OF THE INVENTION

Accordingly, it is an object of this invention to eliminate the above-described difficulties accompanying a conventional guide rail sideward displacement preventing mechanism.

More specifically, an object of the invention is to provide a guide rail sideward displacement preventing mechanism for a linear guide device, which is based on the effect of a key formed when a hardenable filling material is solidified, to dispense with the troublesome operations of forming the stepped surface in the machine bed or table and the lateral push plate, thus being simple in structure and considerably high in the ability of preventing the sideward displacement of the guide rail.

The foregoing object of the invention has been achieved by the provision of a guide rail sideward displacement preventing mechanism for a linear guide device in which a guide rail with which a slider is engaged in such a manner as to be movable relative to the guide rail is fixedly secured to the mounting surface of a supporting member adapted to support the linear guide device, a mechanism for preventing the guide rail from displacing laterally; in which according to the invention, recesses are formed in the mounting surface of the guide rail and in the mounting surface of the supporting member which is in contact with the mounting surface of the guide rail, respectively, to provide a space therein, and the space thus provided is filled with a hardenable filling material, and the hardenable filling material is solidified therein.

The hardenable filling material filled in the space, which is provided by the recesses formed in the mounting surface of the guide rail and the mounting surface of the supporting member such as a machine bed, is solidified as it is. The material thus solidified functions as a key arranged between the guide rail and the supporting member, and the space functions as a key groove, thus positively prevent the lateral displacement of the guide rail. With the mechanism, it is unnecessary to finish the recesses or the space so accurately as in the case of a general key groove in which a metal key is inserted, and even if the recesses are somewhat shifted from each other, the solidified material functions in the same way.

In addition, the foregoing object of the invention has been achieved by the provision of a linear guide device, according to a second aspect of the present invention, comprising:

a guide rail secured to a base by a bolt member, the guide rail having ball rolling grooves in its both side walls;

a slider body slidably engaged with the guide rail, the slider having ball rolling grooves disposed in opposed relation to the ball rolling grooves of the guide rail and ball returning paths formed in parallel to the ball rolling grooves thereof;

end caps secured respectively to both ends of the slider body, the end caps having curved paths for communicating the ball returning path and a space defined by the opposed ball rolling grooves, a plurality of balls inserted in a endless circulating path which was constructed by the curved path, the returning path and a space defined by the ball rolling grooves; and a means for preventing the guide rail from being displaced sideward, the displacement preventing means is a hardenable filling material filling into a space defined by a first recess member and a second recess member, in which the first recess member is formed in a mounted surface of the base on which the guide rail is mounted and the second recess member is formed on a mounting surface of the guide rail which is in contact with the mounted surface of the base, and the hardenable filling material is solidified in the space.

The nature, principle, and utility of the invention will be more clearly understood from the following detailed description of the invention when read in conjunction with the accompanying drawings.

BRIEF DESCRIPTION OF THE DRAWING(S)

DETAILED DESCRIPTION OF THE PREFERRED EMBODIMENTS

Figure 1:
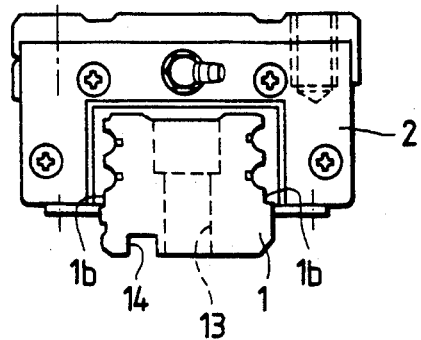
FIG. 1 is a front view of a linear guide device with a slider on a guide rail, which constitutes one embodiment of this invention.
Figure 2:
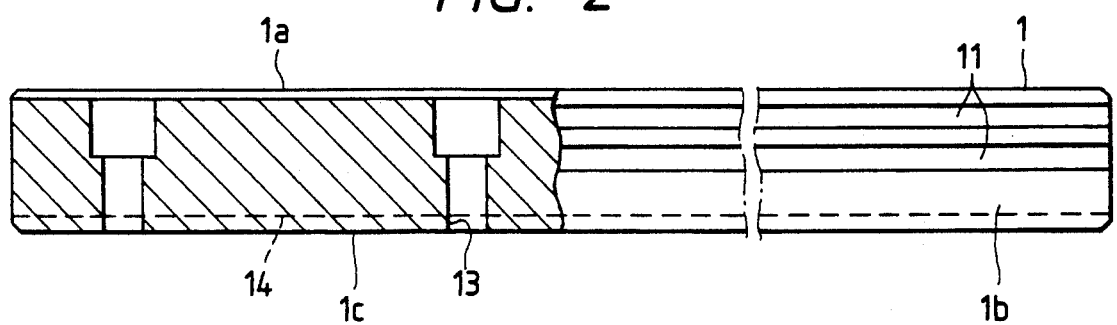
FIG. 2 is a side view of the guide rail shown in FIG. 1.
Figure 3:
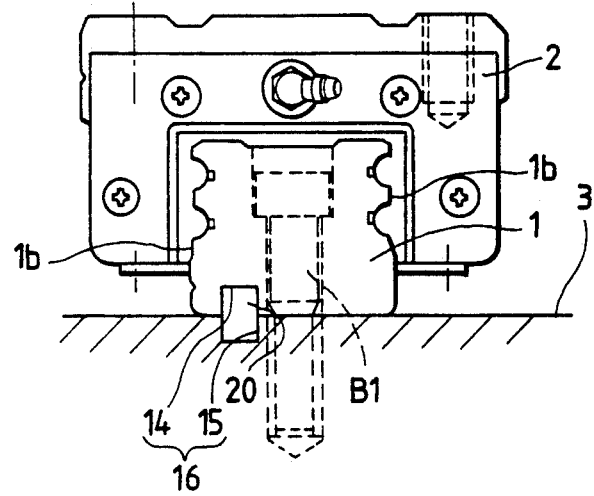
FIG. 3 is a front view showing the linear guide device the guide rail of which is fixedly mounted on a machine bed, for a description of a guide rail sideward displacement preventing mechanism according to the invention.
Figure 6:
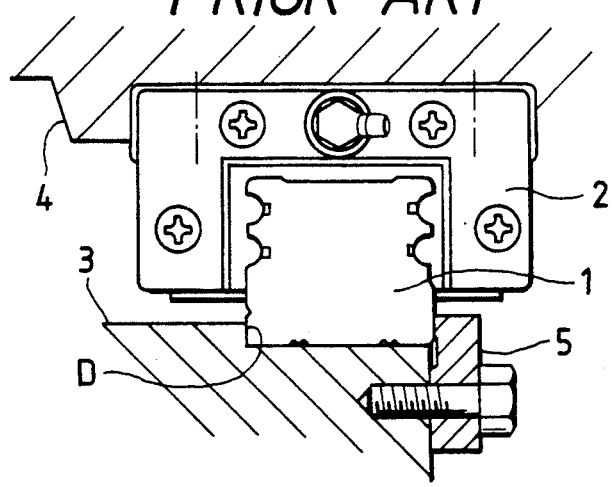
FIG. 6 is a sectional view of a conventional guide rail sideward displacement preventing mechanism.
Figure 5A:
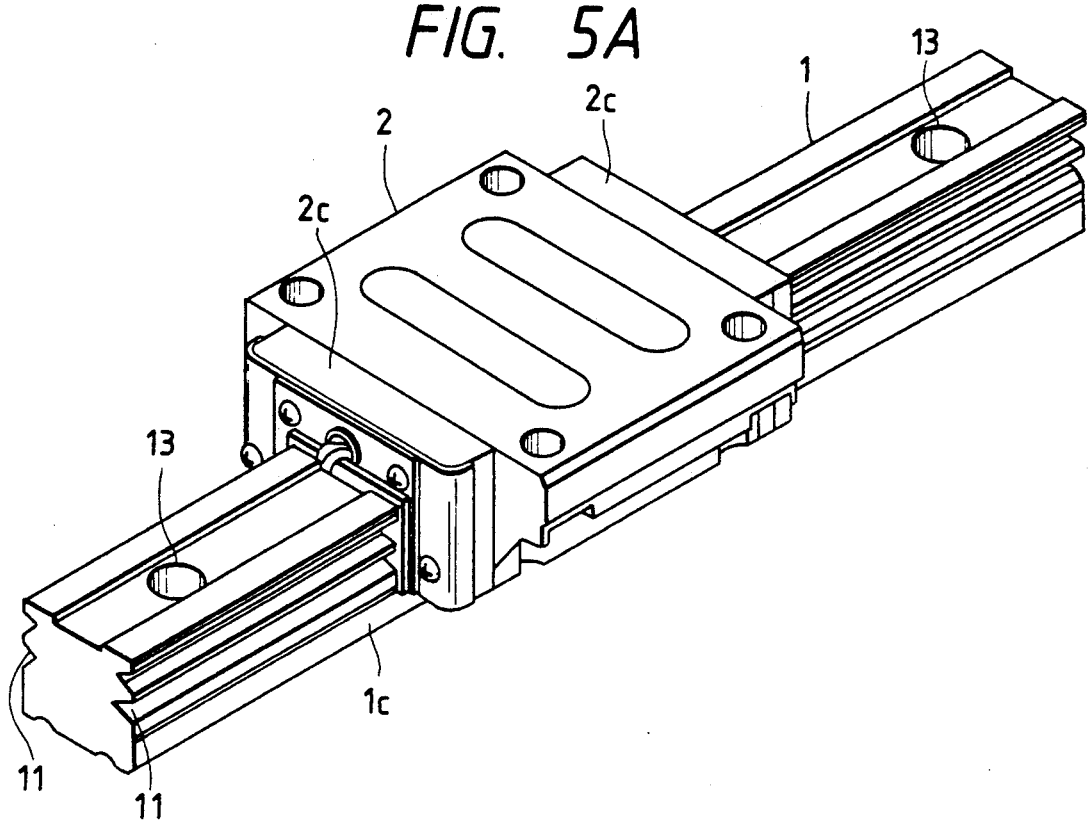
FIG. 5A is a perspective view of an overall construction of a linear guide device with a slider on a guide rail, which constitutes the one embodiment of this invention.
Figure 5B:
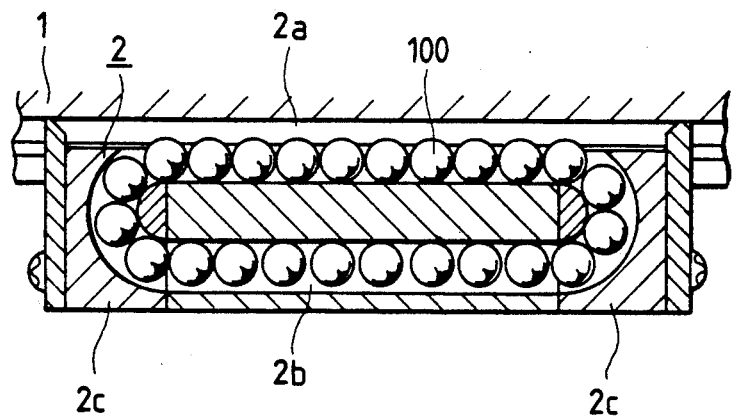
FIG. 5B is a sectional view taken along X—X in FIG. 5A.

One preferred embodiment of this invention, will be described with reference to FIGS. 1 through 3, in which parts corresponding functionally to those which have been described with reference to FIG. 6 (the prior art) are therefore designated by the same reference numerals or characters.

A linear guide device according to the embodiment of the invention, as shown in FIGS. 1 through 3 and FIGS. 5A and 5B, comprises a guide rail 1 which has ball rolling grooves 11 in its both side walls 1b and 1b, and a plurality of through-holes 13 for rail mounting bolts B1 which are extended vertically and arranged axially at predetermined intervals. The guide rail 1 secured to a machine bed 3 by a plurality of bolts which are respectively inserted into the 4hrough-holes 13. The slider 2 is slidably engaged with the guide rail, and the slider has ball rolling grooves 2a disposed in opposed relation to the ball rolling grooves 11 of the guide rail 1 and ball returning paths 2b formed in parallel to the ball rolling grooves 11 thereof. A pair of end caps 2c are secured respectively to both ends of the slider body 1, and the end caps 2c has curved paths for communicating the ball returning path 2b and a space defined by the opposed ball rolling grooves (11 and 2a). A plurality of balls 100 are inserted in a endless circulating path which was constructed by the curved path, the returning path 2b and a space defined by the ball rolling grooves (11 and 2a).

A recess 14 rectangular in section is formed in the mounting surface (or lower surface) 1c of the guide rail 1 beside the through-holes 13. The recess 14 is extended over the entire length of the rail guide. In correspondence to the recess 14, another recess 15 rectangular in section is formed in the machine bed 3, so that the two recesses 14 and 15 provide a space 16 in the guide rail and the machine bed, which is to be filled with a hardenable filling material. The space 16 thus provided, and the hardenable filling material solidified in it form a guide rail sideward displacement preventing mechanism according to the invention.

The guide rail 1 is positioned accurately so that the recesses 14 and 15 are in alignment with each other, and secured to the machine bed with the rail mounting bolts B1. Under this condition, the space 16 provided by the recesses 14 and 15 is filled with a hardenable filling material 20, and the latter 20 is solidified as it is.

It is preferable that the hardenable filling material 20 is high in viscosity to some extent, but it does not flow from the space 16 along the contact surface of the guide rail and the machine bed to the rail mounting bolts B1, and its volume is not decreased when solidified. One example of the hardenable filling material 20 is hardenable epoxy resin. Fibers and granular materials may be added to the hardenable filling material so that the latter is increased in strength and prevented from shrinkage when solidified. In this case, preferably the fibers preferably are carbon fibers; however, glass fibers may be employed, too. And the granular materials may be mica, $Al_2O_3$ (alumina), ceramic, graphite, carbon graphite, etc.

When the hardenable filling material 20 in the space 16 is solidified, it becomes a member corresponding to a key (hereinafter referred to as "a key member", when applicable) which is set between the guide rail 1 and the machine bed 3 to tie them together. Therefore, a lateral load applied to the guide rail 1 is transmitted to the machine bed through the solidified hardenable filling material, namely, the key member, which prevents the lateral displacement of the guide rail. In this case, the space 16 corresponds to a key groove. However, it should be noted that it is unnecessary to finish the space 16 so accurately as in the case of a general key groove in which a metal key is inserted.

The guide rail 1 is fixedly secured to the machine bed 3 both by the frictional force which acts on the lower surface 1c of the guide rail when the bolts B1 are tightened, and by the key effect of the solidified hardenable filling material. Hence, even if a great impact is applied to the guide rail 1, the latter 1 will not be displaced sidewards.

As is apparent from the above description, with the lateral displacement preventing mechanism of the invention, the guide rail can be prevented from being laterally displaced without formation of the stepped surface D in the machine bed 3. Accordingly, it is unnecessary to form the lateral push plate 5, nor to form a number of tapped holes for mounting the lateral push plate 5. That is, in the invention, the lateral displacement of the guide rail is positively prevented by the simple method in which the recesses 14 and 15, which may be low in accuracy, are formed in the guide rail 1 and the machine bed 3, respectively, to provide the space 16 therein, and the latter 16 is filled with the hardenable filling material 20, and the latter 20 in the space 16 is solidified as it is. That is, the lateral displacement preventing mechanism of the invention is simple in arrangement, and can be formed readily, yet it is able to effectively prevent the guide rail from being displaced sidewards.

Figure 4:
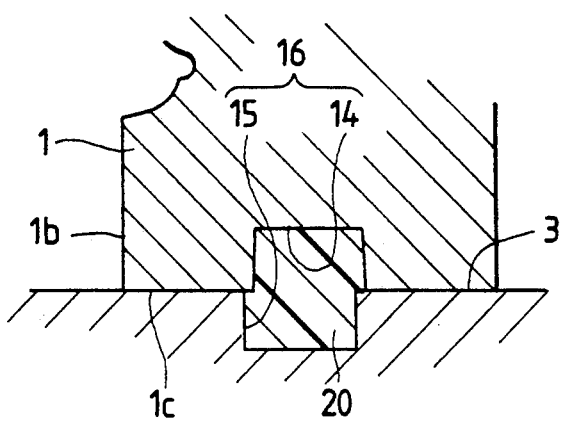
FIG. 4 is an enlarged front view showing one modification of the sideward displacement preventing mechanism shown in FIG. 3.

In the above-described embodiment, the recesses 14 and 15 are rectangular in section; however, the invention is not limited thereto or thereby. F/r instance, the recesses 14 and 15 may be trapezoidal in section. In addition, the recesses 14 and 15, as shown in FIG. 4, may be somewhat shifted from each other. Furthermore, in the above-described embodiment, the recesses 14 and 15 are each continuous extending over the entire length of the guide rail 1; however, the invention is not limited thereto or thereby. F/r instance, the recess 14 and/or the recess 15 may be formed discontinuous; that is, the recess may be divided into a plurality of parts arranged in a line. In this case, in order to sufficiently fill the discontinuous spaces with the hardenable filling material, injecting paths are formed in the lower surface 1c of the guide rail which are extended from the side wall 1b to the recesses 14.

The invention has been described with reference to the linear guide device in which the slide is set over the guide rail as shown in the accompanying drawing. However, it should be noted that the technical concept of the invention is applicable to a linear guide device different in which a slider is moved in a guide railed U-shaped in section.

As was described above, in the guide rail sideward displacement preventing mechanism of the invention, the recesses are formed in the lower surface of the guide rail and the mounting surface of the machine bed, to provide the space therein, and the space thus provided is filled with the hardenable filling material, and the latter is solidified therein as it is. Hence, the mechanism of the invention is free from the difficulties accompanying the conventional guide rail sideward displacement preventing mechanism that, in order to fixedly hold the guide rail, it is necessary to form the stepped surface in the machine bed, and the lateral push plate, and to form a number of tapped holes in the machine bed to fixedly secure the lateral push plate to the machine bed. That is, the guide rail sideward displacement prevention mechanism of the invention is simple in construction, yet it positively prevents the guide rail from being displaced laterally even when a great impact is applied to it.

In the modification in which the space formed between the guide rail and the machine bed to receive the hardenable filling material, is divided into plural discontinuous parts, the guide rail is prevented from being displaced not only laterally but also longitudinally.

While there has been described in connection with the preferred embodiment of this invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A linear guide device comprising:
    a guide rail fixedly secured by a bolt member to the mounted surface of a supporting member adapted to support said linear guide device;
    a slider engaged with said guide rail so as to be movable relative to said guide rail; and
    a guide rail sideward displacement preventing mechanism in which recesses are formed in the mounting surface of said guide rail and in the mounted surface of said supporting member which is in contact with the mounting surface of said guide rail, respectively, to provide a space therein, and said space thus provided is filled with a hardenable filling material, and said hardenable filling material is solidified therein.

2. A linear guide device according to claim 1, in which said recesses of said guide rail are formed between said bolt member and a side wall of said guide rail 3. A linear guide device according to claim 1, in which said hardenable filling material is a hardenable epoxy resin.

4. A linear guide device according to claim 1, in which at least one of said recesses of said guide rail and said support member are continuous extending over the entire length of said guide rail.

5. A linear guide device according to claim 1, in which at least one of said recesses of said guide rail and said support member are formed discontinuous so as to be divided into a plurality of parts arranged in a line.

6. A linear guide device comprising:
    a guide rail secured to a base by a bolt member, said guide rail having ball rolling grooves in its both side walls;
    a slider body slidably engaged with said guide rail, said slider having ball rolling grooves disposed in opposed relation to said ball rolling grooves of said guide rail and ball returning paths formed in parallel to said ball rolling grooves thereof;
    end caps secured respectively to both ends of said slider body, said end caps having curved paths for communicating said ball returning path and a space defined by said opposed ball rolling grooves;
    a plurality of balls inserted in a endless circulating path which was constructed by said curved path, said returning path and said space defined by said opposed ball rolling grooves; and
    a means for preventing said guide rail from being displaced sideward, said displacement preventing means is a hardenable filling material filling into a space defined by a first recess member and a second recess member, in which said first recess member is formed in a mounted surface of said base on which said guide rail is mounted and said second recess member is formed on a mounting surface of said guide rail which is in contact with the mounted surface of said base, and said hardenable filling material is solidified in said space.

7. A linear guide device according to claim 6, in which said second recess member is formed between said bolt member and said side wall of said guide rail.

8. A linear guide device according to claim 6, in which said hardenable filling material is a hardenable epoxy resin.

9. A linear guide device according to claim 6, in which at least one of said first recess member and said second recess member is continuous extending over the entire length of said guide rail.

10. A linear guide device according to claim 6, in which at least one of said first recess member and said second recess member is formed discontinuous so as to be divided into a plurality of parts arranged in a line.

* * * * *